United States Patent
Albrecht et al.

(10) Patent No.: US 10,406,638 B2
(45) Date of Patent: Sep. 10, 2019

(54) AUGMENTED VISION SYSTEM WITH ACTIVE WELDER GUIDANCE

(71) Applicant: Illinois Tool Works Inc., Glenview, IL (US)

(72) Inventors: Bruce Albrecht, Neenah, WI (US); Richard Beeson, Appleton, WI (US); William J. Becker, Manitowoc, WI (US)

(73) Assignee: Illinois Tool Works Inc., Glenview, IL (US)

( * ) Notice: Subject to any disclaimer, the term of this patent is extended or adjusted under 35 U.S.C. 154(b) by 680 days.

(21) Appl. No.: 14/918,654

(22) Filed: Oct. 21, 2015

(65) Prior Publication Data

US 2016/0250723 A1    Sep. 1, 2016

Related U.S. Application Data

(60) Provisional application No. 62/121,853, filed on Feb. 27, 2015.

(51) Int. Cl.
| | | |
|---|---|---|
| *B23K 37/00* | (2006.01) | |
| *G05B 19/409* | (2006.01) | |
| *B23K 9/095* | (2006.01) | |
| *B23K 9/32* | (2006.01) | |
| *G06F 3/03* | (2006.01) | |

(52) U.S. Cl.
CPC .......... *B23K 37/006* (2013.01); *B23K 9/0956* (2013.01); *B23K 9/322* (2013.01); *G05B 19/409* (2013.01); *G05B 2219/31304* (2013.01); *G05B 2219/32014* (2013.01);
(Continued)

(58) Field of Classification Search
CPC ...... B23K 9/0956; B23K 9/095; B23K 3/322; B23K 37/006; G05B 19/409; G05B 2219/31304; G05B 2219/32014; G05B 2219/35487; G05B 2219/45135; G01P 3/36; G01P 3/38
See application file for complete search history.

(56) References Cited

U.S. PATENT DOCUMENTS

| | | |
|---|---|---|
| 4,021,840 A | 5/1977 | Ellsworth et al. |
| 4,577,796 A | 3/1986 | Powers et al. |

(Continued)

FOREIGN PATENT DOCUMENTS

| | | |
|---|---|---|
| CA | 2725719 A1 | 6/2012 |
| CN | 102378666 | 3/2012 |

(Continued)

OTHER PUBLICATIONS

Intelligenter Schweißbrenner, Intelligent Welding Torch, IP Bewertungs AG (IPB) (12 pages).

(Continued)

*Primary Examiner* — Brian W Jennison
(74) *Attorney, Agent, or Firm* — McAndrews, Held & Malloy, Ltd.

(57) ABSTRACT

Welding headwear comprises a display operable to present images for viewing by a wearer of the welding headwear, and comprises circuitry operable to determine an identifier associated with a workpiece, retrieve, from memory, welding work instructions associated with the identifier, and generate the images for presentation on the display based on said work instructions.

23 Claims, 15 Drawing Sheets

(52) U.S. Cl.
CPC .............. *G05B 2219/35487* (2013.01); *G05B 2219/45135* (2013.01); *G06F 3/0304* (2013.01); *Y02P 90/10* (2015.11)

(56) References Cited

U.S. PATENT DOCUMENTS

| | | | |
|---|---|---|---|
| 4,641,292 | A | 2/1987 | Tunnell et al. |
| 4,733,051 | A | 3/1988 | Nadeau et al. |
| 4,812,614 | A | 3/1989 | Wang et al. |
| 5,572,102 | A | 11/1996 | Goodfellow et al. |
| 5,923,555 | A | 7/1999 | Bailey et al. |
| 5,932,123 | A | 8/1999 | Marhofer et al. |
| 5,978,090 | A | 11/1999 | Burri et al. |
| 6,167,401 | A | 12/2000 | Csipkes et al. |
| 6,242,711 | B1 | 6/2001 | Cooper |
| 6,734,393 | B1* | 5/2004 | Friedl .................... A61F 9/067 219/130.01 |
| 7,534,005 | B1 | 5/2009 | Buckman |
| 7,926,118 | B2 | 4/2011 | Becker et al. |
| 7,962,967 | B2 | 6/2011 | Becker et al. |
| 8,274,013 | B2 | 9/2012 | Wallace |
| 8,316,462 | B2 | 11/2012 | Becker et al. |
| 8,502,866 | B2 | 8/2013 | Becker et al. |
| 8,569,655 | B2 | 10/2013 | Cole |
| 8,605,008 | B1 | 12/2013 | Prest et al. |
| 8,680,434 | B2 | 3/2014 | Stoger et al. |
| 8,915,740 | B2 | 12/2014 | Zboray et al. |
| 8,957,835 | B2 | 2/2015 | Hoellwarth |
| 8,992,226 | B1 | 3/2015 | Leach et al. |
| 2005/0103767 | A1* | 5/2005 | Kainec .................... B23K 9/10 219/130.5 |
| 2007/0187378 | A1 | 8/2007 | Karakas |
| 2009/0231423 | A1* | 9/2009 | Becker .................... A61F 9/06 348/82 |
| 2009/0276930 | A1 | 11/2009 | Becker et al. |
| 2009/0298024 | A1 | 12/2009 | Batzler et al. |
| 2010/0223706 | A1 | 9/2010 | Becker et al. |
| 2011/0117527 | A1 | 5/2011 | Conrardy et al. |
| 2011/0220619 | A1 | 9/2011 | Mehn |
| 2012/0298640 | A1 | 11/2012 | Conrardy et al. |
| 2013/0081293 | A1 | 4/2013 | Delin et al. |
| 2013/0206740 | A1 | 8/2013 | Pfeifer et al. |
| 2013/0206741 | A1* | 8/2013 | Pfeifer .................... B23K 9/095 219/130.01 |
| 2013/0208569 | A1 | 8/2013 | Pfeifer et al. |
| 2013/0215281 | A1 | 8/2013 | Hobby et al. |
| 2013/0291271 | A1 | 11/2013 | Becker et al. |
| 2014/0059730 | A1 | 3/2014 | Kim |
| 2014/0134579 | A1 | 5/2014 | Becker |
| 2014/0134580 | A1 | 5/2014 | Becker |
| 2014/0184496 | A1* | 7/2014 | Gribetz ................ G02B 27/017 345/156 |
| 2014/0185282 | A1 | 7/2014 | Hsu et al. |
| 2014/0205976 | A1 | 7/2014 | Peter et al. |
| 2014/0205979 | A1 | 7/2014 | Peters et al. |
| 2014/0263224 | A1 | 9/2014 | Becker |
| 2014/0272835 | A1 | 9/2014 | Becker |
| 2014/0272836 | A1 | 9/2014 | Becker |
| 2014/0272837 | A1 | 9/2014 | Becker |
| 2014/0272838 | A1 | 9/2014 | Becker |
| 2014/0346158 | A1* | 11/2014 | Matthews ............ B23K 9/0953 219/130.01 |
| 2015/0009316 | A1 | 1/2015 | Baldwin |
| 2015/0072323 | A1 | 3/2015 | Postlethwaite et al. |
| 2015/0125836 | A1 | 5/2015 | Daniel et al. |
| 2015/0154884 | A1 | 6/2015 | Salsich et al. |
| 2015/0248845 | A1 | 9/2015 | Postlethwaite et al. |

FOREIGN PATENT DOCUMENTS

| | | |
|---|---|---|
| EP | 2082656 A1 | 7/2009 |
| JP | 2001041904 | 2/2001 |
| WO | 2008/101379 A1 | 8/2008 |
| WO | 2009/137379 A1 | 11/2009 |
| WO | 2014188244 | 11/2014 |

OTHER PUBLICATIONS

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

LiveArc™ Welding Performance Management System, A reality-based recruiting, screening and training solution, MillerWelds.com 2014 (4 pages).

Handheld Welding Torch with Position Detection technology description, Sep. 21, 2011 (11 pages).

Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_robot_positioning_accuracy (19 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Lutwak, Dr. Robert, DARPA, Microsystems Tech. Office, Micro-Technology for Positioning, Navigation, and Timing Towards PNT Everywhere and Always, Feb. 2014 (4 pages).

Parnian, Neda et al., Integration of a Multi-Camera Vision System and Strapdown Inertial Naviation System (SDINS) with a Modified Kalman Filter, Sensors 2010, 10, 5378-5394; doi: 10.3390/s100605378 (17 pages).

Pipe-Bug, Motorized & Manual Chain Driven Pipe Cutting Machines From Bug-O Systems (4 pages).

Electronic speckle pattern interferometry Wikipedia, the free encyclopedia (4 pages).

Rivers, et al., Position-Correcting Tools for 2D Digital Fabrication (7 pages).

Wavelength Selective Switching, http://en.wikipedia.org/wiki/wavelength_selective_switching, Mar. 4, 2015 (5 pages).

Cavilux® HF, Laser Light for High-Speed Imaging, See What You Have Missed (2 pages).

Cavilux® Smart, Laser Light for Monitoring and High Speed Imaging, Welcome to the Invisible World (2 pages).

Windows 10 to Get 'Holographic' Headset and Cortana, BBC News, www.bbc.com/news/technology-30924022, Feb. 26, 2015 (4 pages).

Daqri Smart Helmet, The World's First Wearable Human Machine Interface, Brochure (9 pages).

Li, Larry, Time-of-Flight Camera—An Introduction, Technical White Paper, SLOA190B—Jan. 2014, revised May 2014 (10 pages).

Heston, Tim, Lights, camera, lean—recording manufacturing efficiency, The Fabricator, Aug. 2010 (4 pages).

Int'l Search Report and Written Opinion for PCT/US2016/012273 dated Apr. 25, 2016 (11 pages).

\* cited by examiner

AUGMENTED VISION SYSTEM WITH ACTIVE WELDER GUIDANCE

PRIORITY CLAIM

This application claims priority to the following application(s), each of which is hereby incorporated herein by reference:

U.S. provisional patent application 62/121,853 titled "AUGMENTED VISION SYSTEM WITH ACTIVE WELDER GUIDANCE" filed on Feb. 27, 2015.

BACKGROUND

Welding is a process that has increasingly become ubiquitous in all industries. While such processes may be automated in certain contexts, a large number of applications continue to exist for manual welding operations, the success of which relies heavily on the proper use of a welding gun or torch by a welding operator. For instance, improper torch angle, contact tip-to-work distance, travel speed, and aim are parameters that may dictate the quality of a weld. Even experienced welding operators, however, often have difficulty monitoring and maintaining these important parameters throughout welding processes.

BRIEF SUMMARY

Methods and systems are provided for weld output control by a welding vision system, substantially as illustrated by and described in connection with at least one of the figures, as set forth more completely in the claims.

DETAILED DESCRIPTION

Figure 1:
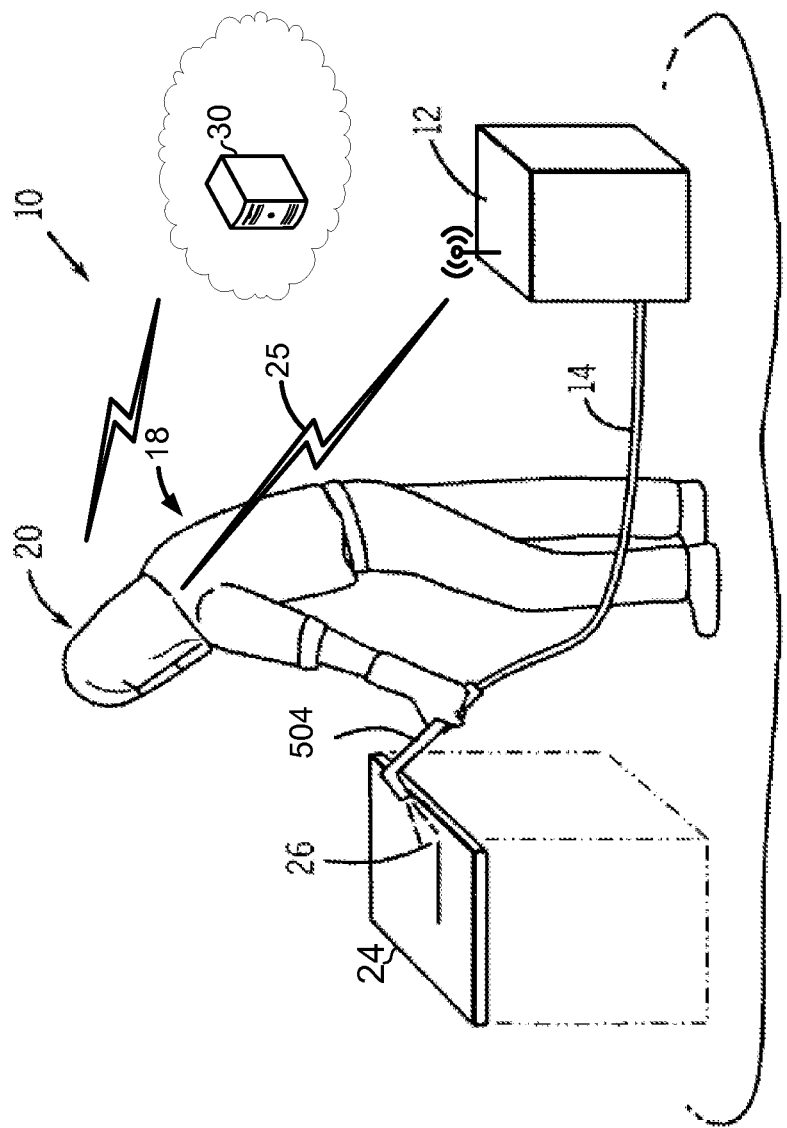
FIG. 1 shows an exemplary arc welding system in accordance with aspects of this disclosure.

Referring to FIG. 1, there is shown an example welding system 10 in which an operator 18 is wearing welding headwear 20 and welding a workpiece 24 using a torch 504 to which power or fuel is delivered by equipment 12 via a conduit 14. The equipment 12 may comprise a power or fuel source, optionally a source of an inert shield gas and, where wire/filler material is to be provided automatically, a wire feeder. The welding system 10 of FIG. 1 may be configured to form a weld joint 512 by any known technique, including flame welding techniques such as oxy-fuel welding and electric welding techniques such as shielded metal arc welding (i.e., stick welding), metal inert gas welding (MIG), tungsten inert gas welding (TIG), and resistance welding.

Optionally in any embodiment, the welding equipment 12 may be arc welding equipment that provides a direct current (DC) or alternating current (AC) to a consumable or non-consumable electrode 16 (better shown, for example, in FIG. 5C) of a torch 504. The electrode 16 delivers the current to the point of welding on the workpiece 24. In the welding system 10, the operator 18 controls the location and operation of the electrode 16 by manipulating the torch 504 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint 512 (the electrode 16 in the case of a consumable electrode or a separate wire or rod in the case of a non-consumable electrode) at the point of welding between electrode 16 and the workpiece 24, thereby forming a weld joint 512 when the metal cools.

As shown, and described more fully below, the equipment 12 and headwear 20 may communicate via a link 25. Such communications may enable the headwear 20 to control settings of the equipment 12 and/or the equipment 12 to provide information about its settings to the headwear 20. Although a wireless link is shown, the link may be wireless, wired, or optical.

Figure 2:
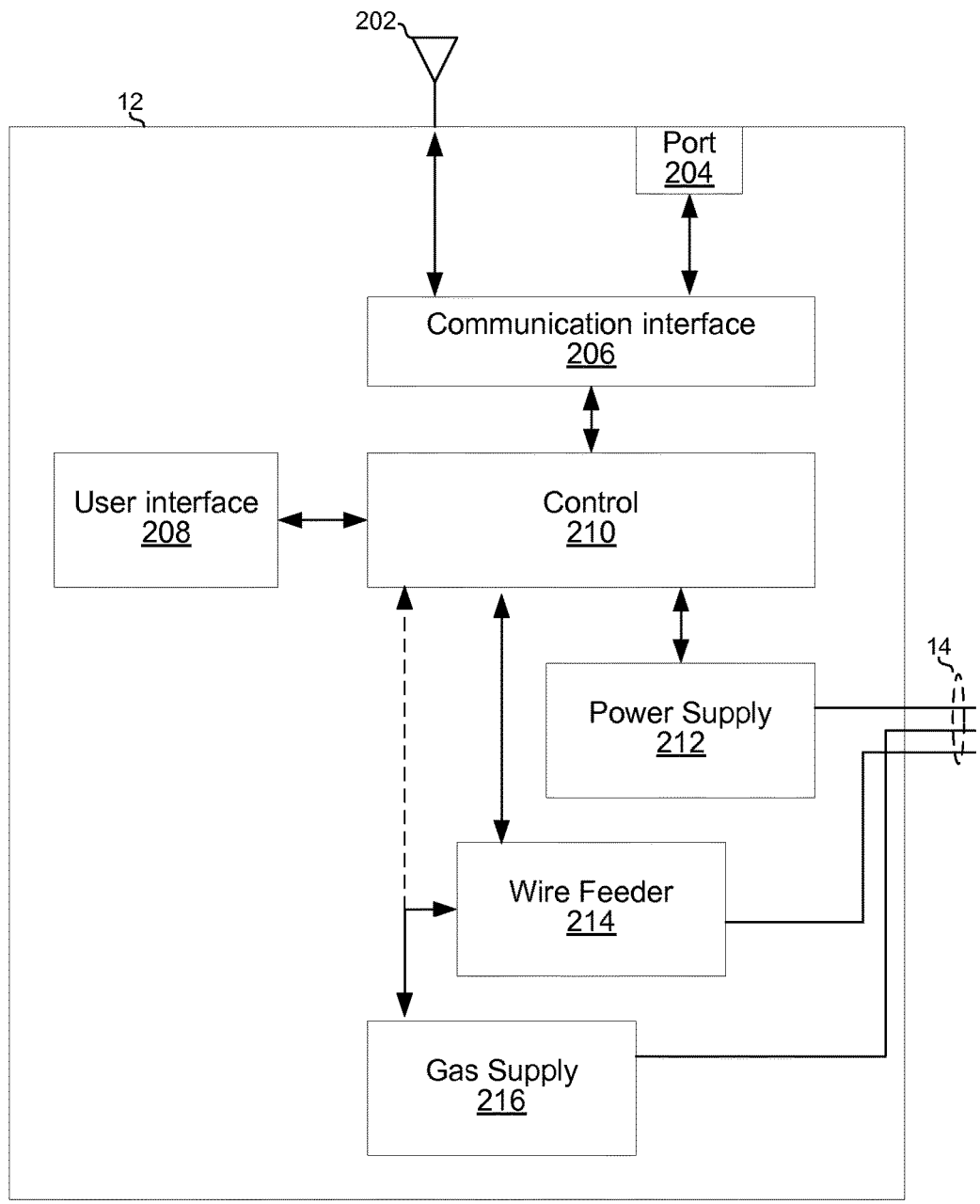
FIG. 2 shows example welding equipment in accordance with aspects of this disclosure.

FIG. 2 shows example welding equipment in accordance with aspects of this disclosure. The equipment 12 of FIG. 2 comprises an antenna 202, a communication port 204, communication interface circuitry 206, user interface module 208, control circuitry 210, power supply circuitry 212, wire feeder module 214, and gas supply module 216.

The antenna 202 may be any type of antenna suited for the frequencies, power levels, etc. used by the communication link 25.

The communication port 204 may comprise, for example, an Ethernet over twisted pair port, a USB port, an HDMI port, a passive optical network (PON) port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, accelerometer, gyroscope, magnetometer, etc.) and associated drive circuitry. The user interface 208 may generate electrical signals in response to any suitable type of user input (e.g., screen touches, button presses, voice commands, gestures (e.g., hand and/or head), etc.). Driver circuitry of the user interface module 208 may condition (e.g., amplify, digitize, etc.) the signals and provide them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, from the user interface 208, from the power supply 212, from the wire feeder 214, and/or from the gas supply 216. The control circuitry 210 comprises circuitry (e.g., a microcontroller and memory) operable to output data and/or control signals to the communication interface 206, to the user interface 208, to the power supply 212, to the wire feeder 214, and/or to the gas supply 216.

The power supply circuitry 212 comprises circuitry for generating power to be delivered to a welding electrode via conduit 14. The power supply circuitry 212 may comprise, for example, one or more voltage regulators, current regulators, inverters, and/or the like. The voltage and/or current output by the power supply circuitry 212 may be controlled by a control signal from the control circuitry 210. The power supply circuitry 212 may also comprise circuitry for reporting the present current and/or voltage to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint 512. The wire feeder 214 may comprise, for example, a spool for holding the wire, an actuator for pulling wire off the spool to deliver to the weld joint 512, and circuitry for controlling the rate at which the actuator delivers the wire. The actuator may be controlled based on a control signal from the control circuitry 210. The wire feeder module 214 may also comprise circuitry for reporting the present wire speed and/or amount of wire remaining to the control circuitry 210. In an example implementation, the wire feeder module 214 may comprise circuitry and/or mechanical components for measuring the wire speed, such that reported speed is actual speed and not simply an expected value based on calibration.

The gas supply module 216 is configured to provide shielding gas via conduit 14 for use during the welding process. The gas supply module 216 may comprise an electrically controlled valve for controlling the rate of gas flow. The valve may be controlled by a control signal from control circuitry 210 (which may be routed through the wire feeder 214 or come directly from the control 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

Figure 3:
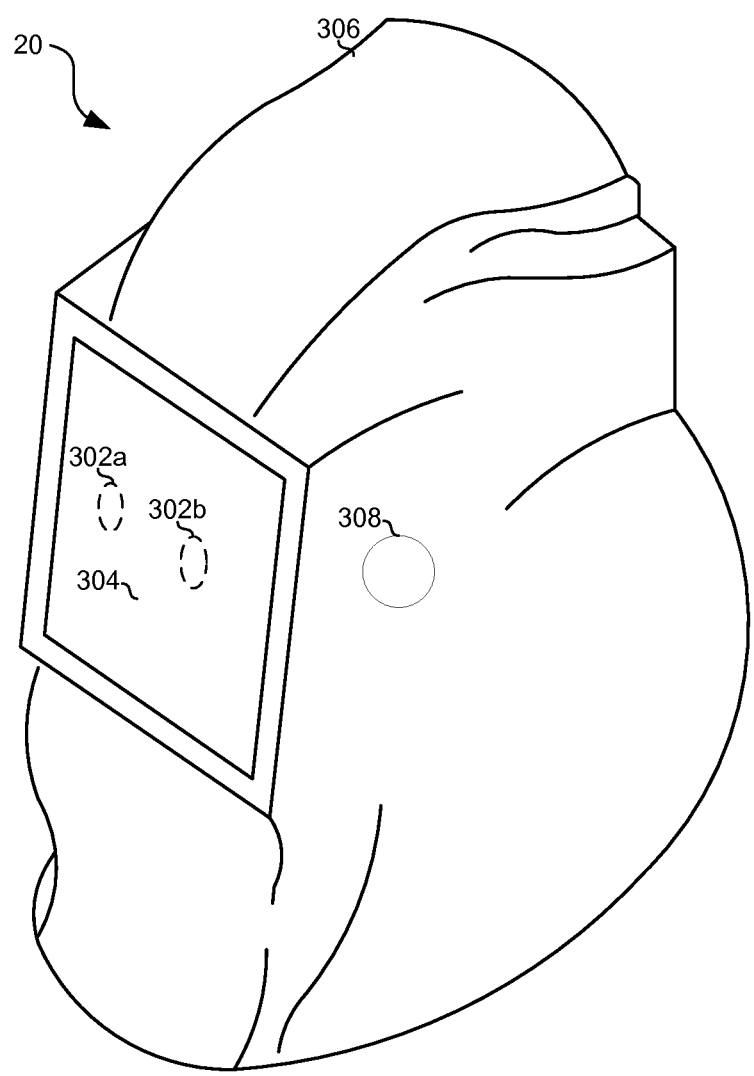
FIG. 3 shows example welding headwear in accordance with aspects of this disclosure.
Figure 4:
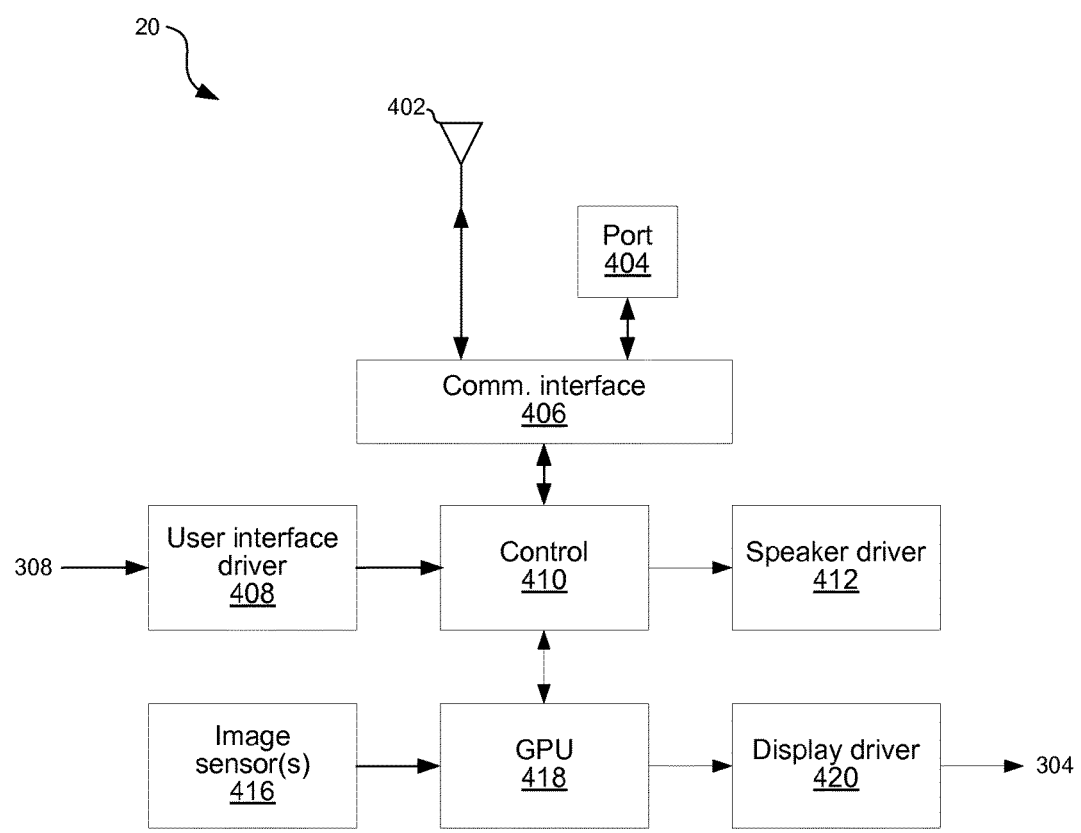
FIG. 4 shows example circuitry of the headwear of FIG. 3.

FIGS. 3 and 4 show example welding headwear in accordance with aspects of this disclosure. The example headwear 20 is a helmet comprising a shell 306 in or to which are mounted: one or more cameras comprising optical components 302 and image sensor(s) 416, a display 304, electromechanical user interface components 308, an antenna 402, a communication port 404, a communication interface 406, user interface driver circuitry 408, a central processing unit (CPU) 410, speaker driver circuitry 412, graphics processing unit (GPU) 418, and display driver circuitry 420. In other embodiments, rather than a helmet, the headwear may be, for example, a mask, glasses, goggles, attachment for a mask, attachment for glasses, or attachment for goggles, etc.

Each set of optics 302 may comprise, for example, one or more lenses, filters, and/or other optical components for capturing electromagnetic waves in the spectrum ranging from, for example, infrared to ultraviolet. In an example implementation, optics 302a and 302b for two cameras may be positioned approximately centered with the eyes of a wearer of the headwear 20 to capture stereoscopic images (at any suitable frame rate ranging from still photos to video at 30 fps, 100 fps, or higher) of the field of view that a wearer of the headwear 20 would have if looking through a lens.

The display 304 may comprise, for example, a LCD, LED, OLED. E-ink, and/or any other suitable type of display operable to convert electrical signals into optical signals viewable by a wearer of the headwear 20.

The electromechanical user interface components 308 may comprise, for example, one or more touchscreen elements, speakers, microphones, physical buttons, etc. that generate electric signals in response to user input via the user interface 208. For example, electromechanical user interface components 308 may comprise capacity, inductive, or resistive touchscreen sensors mounted on the back of the display 304 (i.e., on the outside of the headwear 20) that enable a wearer of the headwear 20 to interact with user graphics displayed on the front of the display 304 (i.e., on the inside of the headwear 20).

The antenna 402 may be any type of antenna suited for the frequencies, power levels, etc. used by the communication link 25.

The communication port 404 may comprise, for example, an Ethernet over twisted pair port, a USB port, an HDMI port, a passive optical network (PON) port, and/or any other suitable port for interfacing with a wired or optical cable.

The communication interface circuitry 406 is operable to interface the control circuitry 410 to the antenna 202 and port 204 for transmit and receive operations. For transmit operations, the communication interface 406 may receive data from the control circuitry 410 and packetize the data and convert the data to physical layer signals in accordance with protocols in use on the communication link 25. The data to be transmitted may comprise, for example, control signals for controlling the equipment 12. For receive operations, the communication interface may receive physical layer signals via the antenna 202 or port 204, recover data from the received physical layer signals (demodulate, decode, etc.), and provide the data to control circuitry 410. The received data may comprise, for example, indications of present settings and/or actual measured output of the equipment 12. For electric welding this may comprise, for example, voltage, amperage, and/or wire speed settings and/or measurements. For flame welding this may comprise, for example, gas flow rate and/or gas mixture ratio settings and/or measurements.

The user interface driver circuitry 408 is operable to condition (e.g., amplify, digitize, etc.) signals from the user interface component(s) 308.

The control circuitry 410 is operable to process data from the communication interface 406, the user interface driver 408, and the GPU 418, and to generate control and/or data signals to be output to the speaker driver circuitry 412, the GPU 418, and the communication interface 406. Signals output to the communication interface 406 may comprise, for example, signals to control settings of equipment 12. Such signals may be generated based on signals from the GPU 418 and/or the user interface driver 408. Signals from the communication interface 406 may comprise, for example, indications (received via link 25) of present settings and/or actual measured output of the equipment 12.

Signals to the GPU 418 may comprise, for example, signals to control graphical elements of a user interface presented on display 304. Signals from the GPU 418 may comprise, for example, information determined based on analysis of pixel data captured by images sensors 416.

The speaker driver circuitry 412 is operable to condition (e.g., convert to analog, amplify, etc.) signals from the control circuitry 410 for output to one or more speakers of the user interface components 308. Such signals may, for example, carry audio to alert a wearer of the headwear 20 that a welding parameter is out of tolerance, to provide audio guidance to the wearer of the headwear 20, etc.

The image sensor(s) 416 may comprise, for example, CMOS or CCD image sensors operable to convert optical signals to digital pixel data and output the pixel data to GPU 418.

The graphics processing unit (GPU) 418 is operable to receive and process pixel data (e.g., of stereoscopic or two-dimensional images) from the image sensor(s) 416, to output one or more signals to the control circuitry 410, and to output pixel data to the display 304.

The processing of pixel data by the GPU 418 may comprise, for example, analyzing the pixel data to determine, in real-time (e.g., with latency less than 100 milliseconds or, more preferably, less than 20 milliseconds, or more preferably still, less than 5 milliseconds), one or more of the following: name, size, part number, type of metal, or other characteristics of the workpiece 24; name, size, part number, type of metal, or other characteristics of the electrode 16 and/or filler material; type or geometry of joint 512 to be welded; 2-D or 3-D position of items (e.g., electrode, workpiece, etc.) in the captured field of view, one or more weld parameters (e.g., such as those described below with reference to FIG. 5) for an in-progress weld in the field of view; measurements of one or more items in the field of view (e.g., size of a joint or workpiece being welded, size of a bead formed during the weld, size of a weld puddle formed during the weld, and/or the like); and/or any other information which may be gleaned from the pixel data and which may be helpful in achieving a better weld, training the operator, calibrating the system 10, etc.

The information output from the GPU 418 to the control circuitry 410 may comprise the information determined from the pixel analysis.

The pixel data output from the GPU 418 to the display 304 may provide a mediated reality view for the wearer of the headwear 20. In such a view, the wearer experiences the video presented on the display 304 as if s/he is looking through a lens, but with the image enhanced and/or supplemented by an on-screen display. The enhancements (e.g., adjust contrast, brightness, saturation, sharpness, etc.) may enable the wearer of the headwear 20 to see things s/he could not see with simply a lens. The on-screen display may comprise text, graphics, etc. overlaid on the video to provide visualizations of equipment settings received from the control circuit 410 and/or visualizations of information determined from the analysis of the pixel data.

The display driver circuitry 420 is operable to generate control signals (e.g., bias and timing signals) for the display 304 and to condition (e.g., level control synchronize, packetize, format, etc.) pixel data from the GPU 418 for conveyance to the display 304.

Figure 5A:
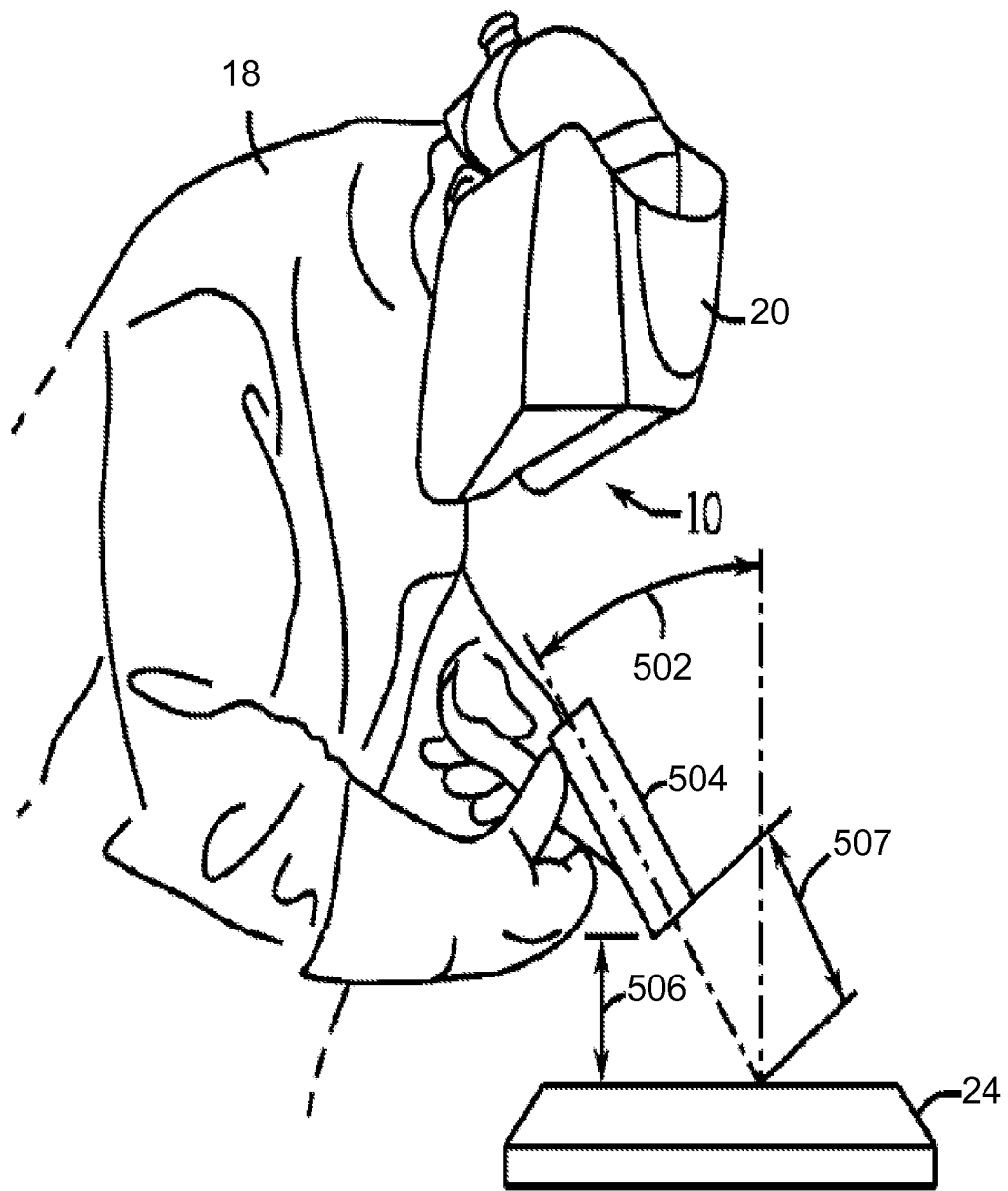
FIGS. 5A-5C illustrate various parameters which may be determined from images of a weld in progress.
Figure 5B:
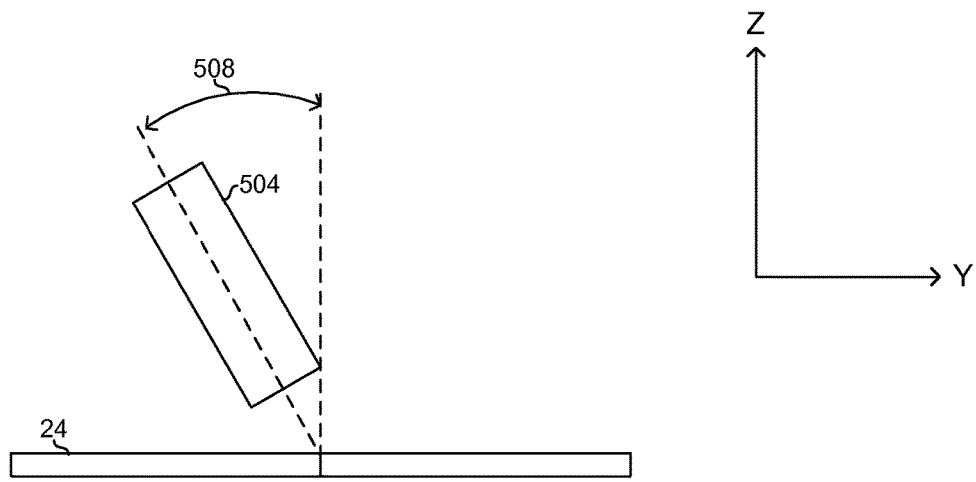
Figure 5C:
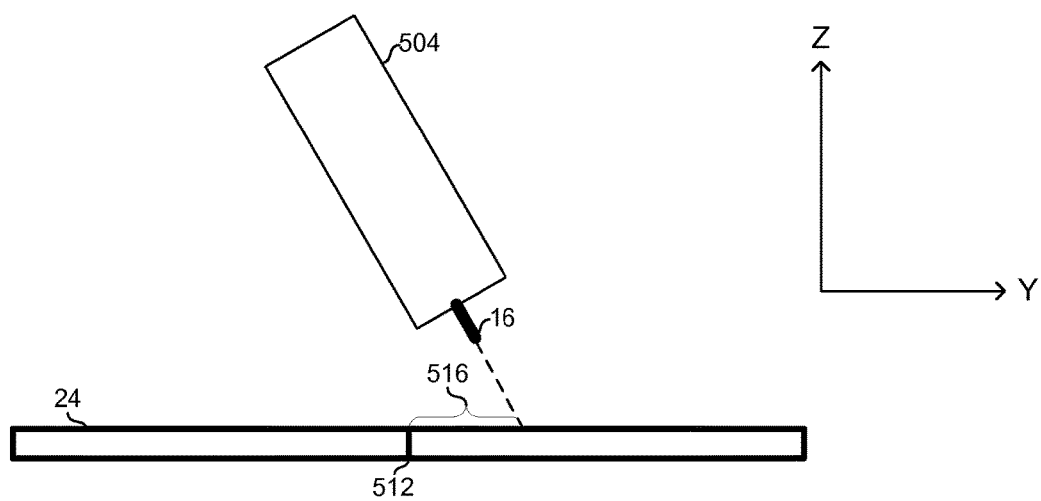

FIGS. 5A-5C illustrate various parameters which may be determined from images of a weld in progress. Coordinate axes are shown for reference. In FIG. 5A the Z axis points to the top of the paper, the X axis points to the right, and the Y axis points into the paper. In FIGS. 5B and 5C, the Z axis points to the top of the paper, the Y axis points to the right, and the X axis points into the paper.

In FIGS. 5A-5C, the equipment 12 comprises a MIG gun 504 that feeds a consumable electrode 16 to a weld joint 512 of the workpiece 24. During the welding operation, a position of the MIG gun 504 may be defined by parameters including: contact tip-to-work distance 506 or 507, a travel angle 502, a work angle 508, a travel speed 510, and aim.

Contact tip-to-work distance may include the vertical distance 506 from a tip of the torch 504 to the workpiece 24 as illustrated in FIG. 5A. In other embodiments, the contact tip-to-work distance may be the distance 507 from the tip of the torch 504 to the workpiece 24 at the angle of the torch 504 to the workpiece 24).

The travel angle 502 is the angle of the gun 504 and/or electrode 16 along the axis of travel (X axis in the example shown in FIGS. 5A-5C).

The work angle 508 is the angle of the gun 504 and/or electrode 16 perpendicular to the axis of travel (Y axis in the example shown in FIGS. 5A-5C).

The travel speed is the speed at which the gun 504 and/or electrode 16 moves along the joint 512 being welded.

The aim is a measure of the position of the electrode 16 with respect to the joint 512 to be welded. Aim may be measured, for example, as distance from the center of the joint 512 in a direction perpendicular to the direction of travel. FIG. 5C, for example, depicts an example aim measurement 516.

FIGS. 6A-6E illustrate an example welding process using headwear embodying aspects of this disclosure.

The process begins with block 652, in which one or more welds to be performed are determined by the headwear 20. The determination may be based on an identifier (e.g., a work order number, a part number, etc.) entered by a wearer of the headwear 20 via the user interface 208. Alternatively, or additionally, the wearer of the headwear 20 may view the workpiece to be welded from a distance and/or angle that permit(s) the camera(s) 302 to capture an image of the workpiece from which an image processing algorithm can detect welds to be performed. For example, unique shapes, markings, and/or other features of a workpiece in the captured image view may be detected and used to retrieve an identifier associated with the workpiece. Alternatively, or additionally, the wearer of the headwear 20 may view work instructions (e.g., paper or on a monitor) from a distance and/or angle that permit(s) the camera(s) 302 to capture an image of the work instructions from which an image processing algorithm can detect welds to be performed (e.g., the work instructions may have a bar code, QR code or some other recognizable features which may be used to retrieve a digital version of the work instructions.)

In block 654, work instructions for the weld(s) to be performed are retrieved from memory (e.g., local memory in the 20 and/or network-based memory). For example, the identifier determined in block 652 may be used as an index to retrieve a corresponding entry in a database residing in server 30 (FIG. 1). The retrieved work instructions may comprise, for example, text and/or images (still images, video, and/or CAD drawings) of any format suitable for presentation on the display 304. Information contained in the work instructions may include, for example: number of welds to be performed on the workpiece, sequence in which a plurality of welds are to be performed, target welding parameters for each weld to be performed, nominal equipment settings to be used for each weld to be performed, identification of welding materials (electrode, filler material, etc.) to be used for each weld to be performed, how to prepare a workpiece for each weld to be performed (e.g., how to put parts in jigs, screwing/bolting torque values, prepping/cleaning of tools, etc.), and/or the like. Information contained in the work instructions may include, for example, inventory levels of parts/materials/etc. (e.g., wire, contact tips, gas, consumables, and parts in the work instructions, etc.) need for performing the welds, identification of location(s) of the inventory. The weld interface may further enable the operator to use the user interface 208 to order the parts/materials/etc. For example, when inventory is below a determined threshold, a "reorder" interface element may be presented on the display of the headwear 20 and/or a notification may be generated on another device (e.g., the operator's smartphone, computer, etc.) from which the order can be placed.

Figure 6A:
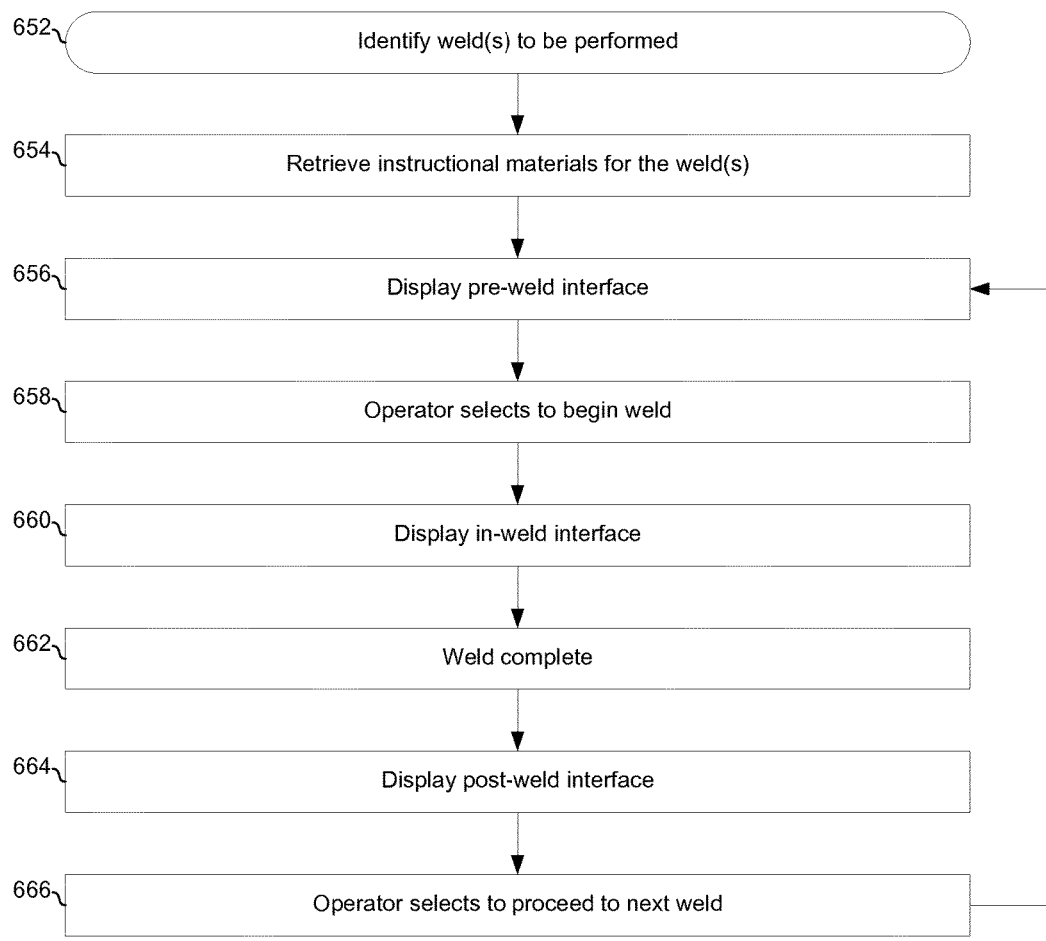
FIGS. 6A-6E illustrate an example welding process using headwear embodying aspects of this disclosure.
Figure 6B:
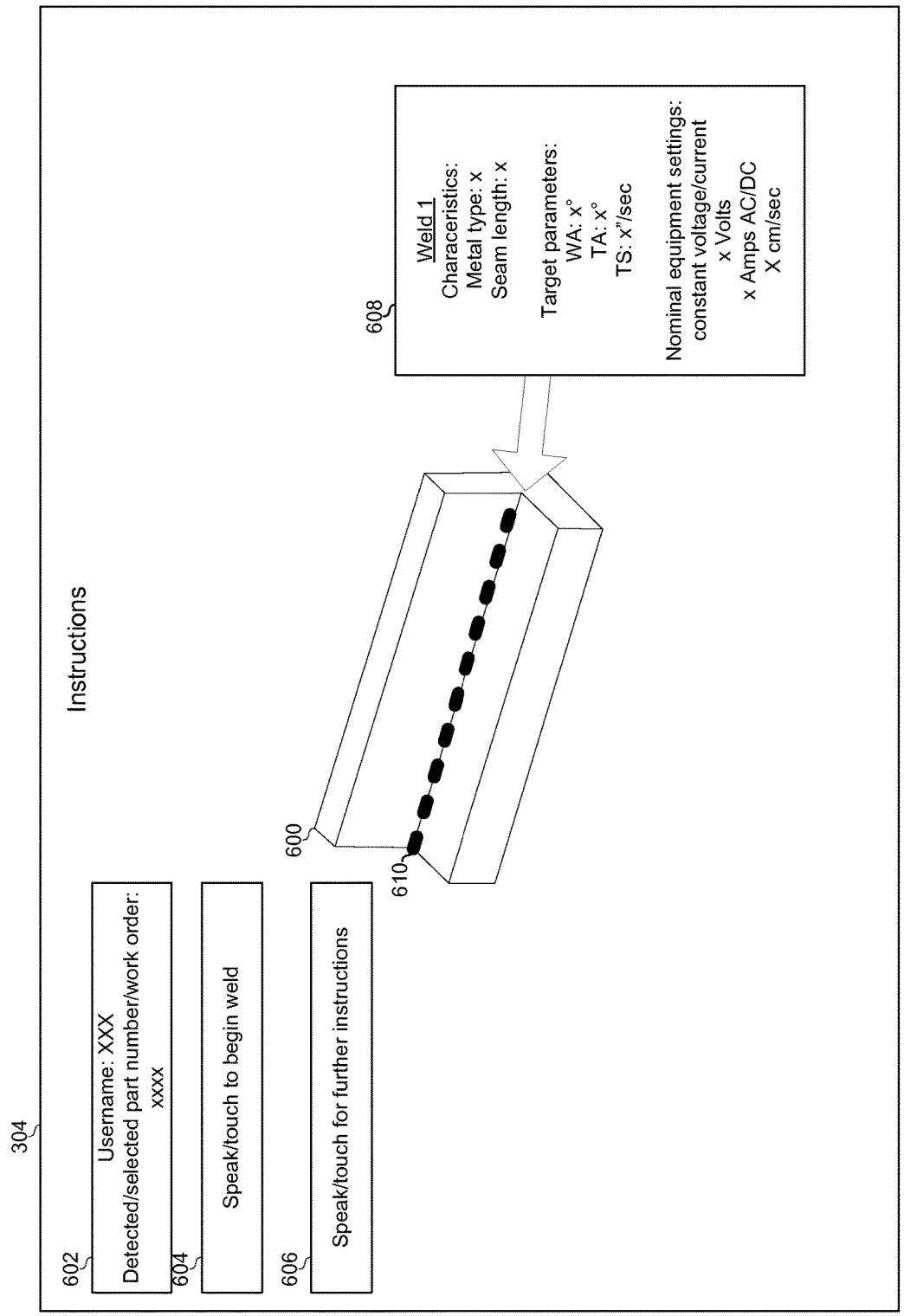

In block 656, a pre-weld interface is presented on display 304. The pre-weld interface may provide work instructions on setting up for a next weld to be performed and/or for actually performing the weld. Referring to FIG. 6B, an example pre-weld interface is shown. The example pre-weld interface comprises graphical elements 602, 604, 606, 608, and 610 overlaid on an image of the workpiece identified in block 652. The image of the workpiece may be a photo or drawing received along with the work instructions or may be an image of the actual workpiece captured (e.g., in block 652) by the camera(s) 302.

The graphic 602 (e.g., a text box) provides the wearer of the headwear 20 with information about the workpiece (e.g., the part number(s) of workpiece(s) to be welded, a work order number for the welds to be performed, and/or the like). The graphic 602 may also display the username of the wearer of the headwear 20, for purposes of storing data to an appropriate user profile. The wearer of the headwear may interact with the graphic 604 via the user interface 208. Activation of the graphic 604 may cause the headwear 20 to close the pre-weld interface and bring up the in-weld interface described below. The wearer of the headwear 20 may interact with the graphic 606 via the user interface 208. Activation of the graphic 606 may cause the headwear 20 to bring up additional work instructions (e.g., to show a previously-recorded video of the weld(s) to be performed). The graphics 608 and 610 identify the next weld to be performed and provide information about performing the weld. In the example shown, the graphic 608 identifies: characteristics of the workpiece such as the type of metal of which it is made; characteristics of the seam to be welded such as its length and width; target parameters for welding the seam such as target work angle, target travel angle, target travel speed, target weave pattern, and/or the like; and nominal equipment settings such as whether a constant current or constant voltage mode should be used, the nominal voltage that should be used, the nominal current that should be used, the type/size of electrode and/or filler material that should be used, the nominal wire speed that should be used, etc.

Figure 6C:
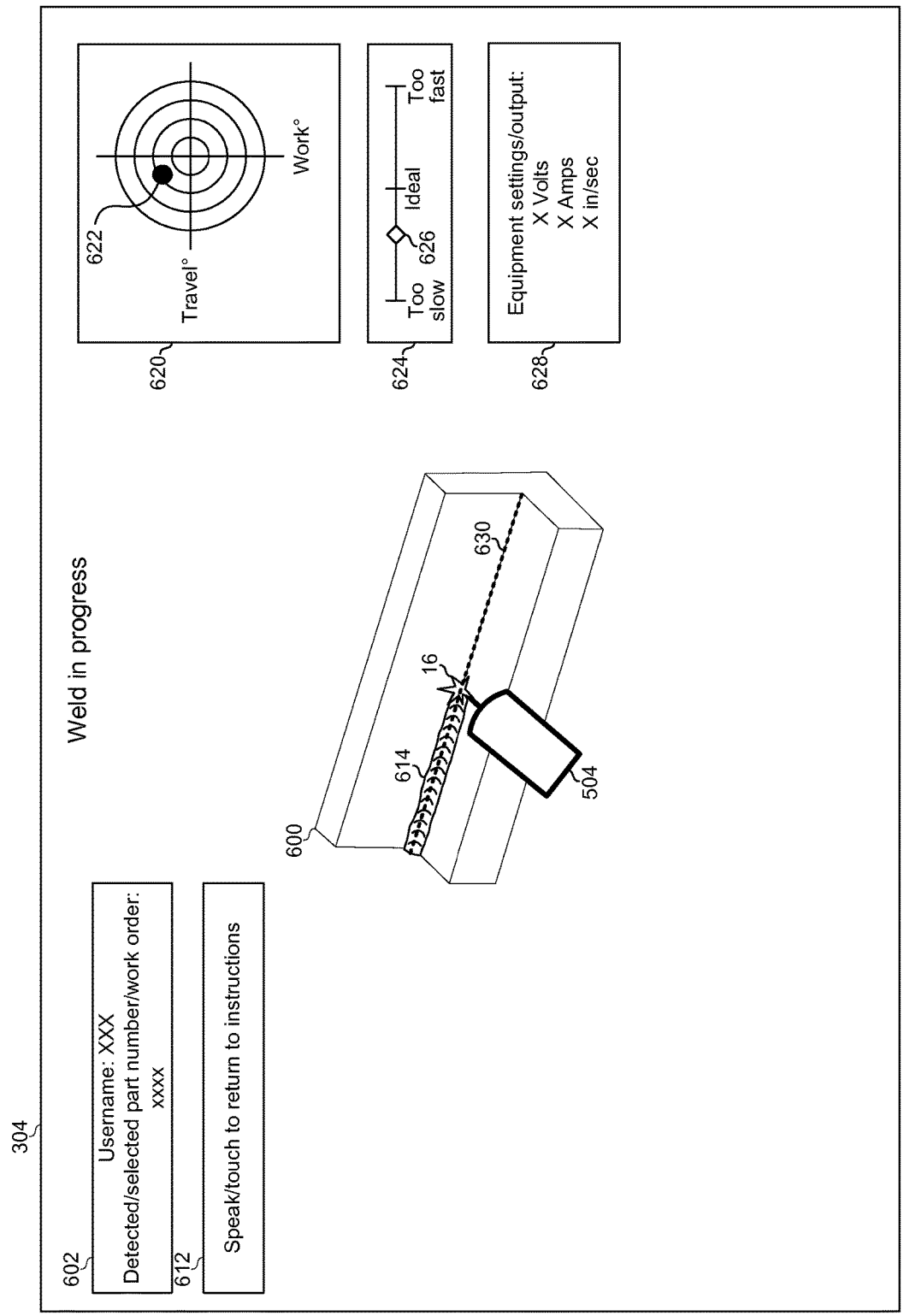

Returning to FIG. 6A, in block 658 the wearer of the headwear 20 triggers (e.g., by activating graphic 604) a transition from the pre-weld interface to an in-weld interface. In block 660, the in-weld interface is presented. The in-weld interface provides work instructions for performing a particular weld. Referring briefly to FIG. 6C, an example in-weld interface is shown. The example in-weld interface comprises graphical elements 602, 612, 620, 624, 628, and 630 overlaid on real-time video frames captured by the camera(s) 302. The real-time video frames may be presented on the display 304 within, for example, 20 milliseconds or, more preferably, 5 milliseconds, of having been captured by the camera(s) 302. The overlaid graphics may be opaque or partially transparent. The graphic 602 (e.g., a text box) provides the wearer of the headwear 20 information about the welds to be performed (e.g., the part number of the workpiece, a work order number for the welds to be performed, and/or the like). The wearer of the headwear 20 may interact with the graphic 612 via the user interface 208. Activation of the graphic 612 may cause the headwear 20 to transition from the in-weld interface back to the pre-weld interface for the current weld. In this manner, the operator is enabled to quickly switch back and forth between the pre-weld interface and the in-weld interface. In an example implementation, both interfaces may be viewed simultaneously (e.g., in a side-by-side or picture-in-picture type view).

The graphics 620, 624, 628, and 630 provide feedback to the wearer of the headwear 20 as to one or more welding parameters measured for a weld in progress. In the example shown, the graphic 620 comprises positional coordinate axes representing work angle and travel angle. The center of the coordinate system indicates the optimal orientation of the welding torch 618 during the weld. An actual orientation of the torch is indicated by dot 622. Based on this feedback, the operator can re-position the torch in an attempt to bring the dot 622 back to center. Other graphical representations of torch angle to provide feedback may be used instead of the "bull's-eye" shown in FIG. 6C. Some examples are described in United States Patent Application Publication 20090298024, which is hereby incorporated herein by reference. In the example shown, the graphic 624 comprises a graphical speedometer extending between a "too slow" marker and a "too fast" marker. A marker 626 indicating the actual speed is provided on the graphical speedometer as a feedback to the wearer of the headwear 20. Other graphical representations of travels speed to provide feedback may be used instead of the linear speedometer shown in FIG. 6C. Some examples are described in United States Patent Application Publication 20090298024, which is hereby incorporated herein by reference. The graphic 628 provides the wearer of the headwear 20 with feedback as to settings and/or actual measured output of the welding equipment 12. The measured output may, for example, present real-time readings from arc monitoring equipment (e.g., presented along a time axis as on an oscilloscope display). The graphic 630 provides a reference path to aid the operator in aiming the electrode at s/he performs the weld. The graphic 630 may, for example, coincide with the centerline of the seam and/or may set forth a weaving pattern. Any images and/or other data captured during the weld may be stored to local memory and/or to remote memory such as memory of server 30.

Figure 6D:
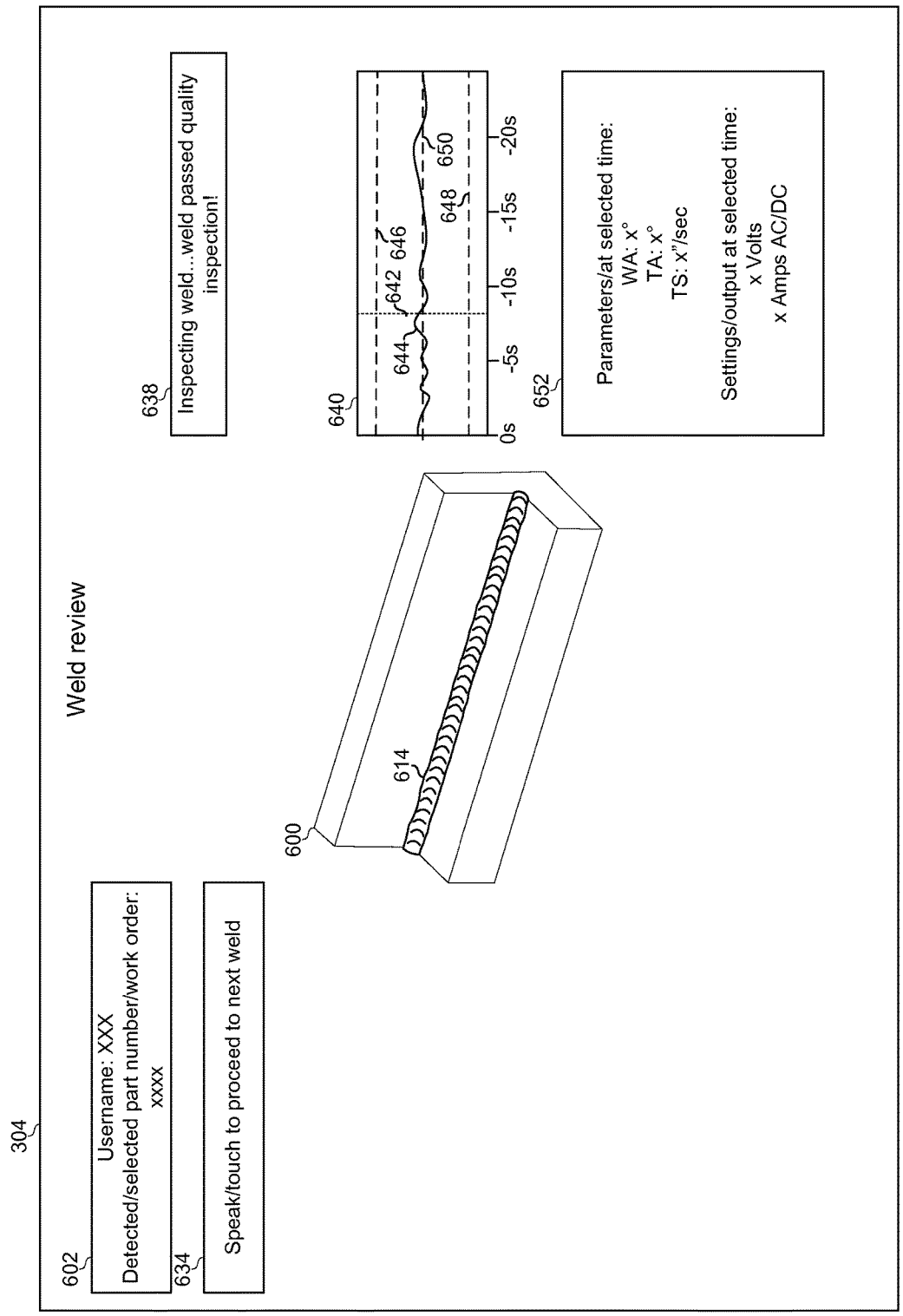

Returning to FIG. 6A, in block 662 the operator completes the weld. In block 664, upon detecting the completion of the weld (e.g., automatically through an image processing algorithm or through input from the operator), the headwear 20 presents a post-weld interface. The post-weld interface presents a summary of the completed weld (e.g., for training and/or quality control purposes). Referring briefly to FIG. 6D, an example post-weld interface is shown. The example post-weld interface comprises graphical elements 602, 634, 638, 640, and 652 overlaid on a video frame captured by the camera(s) 302. The graphic 602 (e.g., a text box) provides the wearer of the headwear 20 with information about the welds to be performed (e.g., part number of a workpiece involved, a work order number for the welds to be performed, and/or the like). The wearer of the headwear 20 may interact with graphic 634 via the user interface 208. Activation of the graphic 634 may cause the headwear 20 to transition from the post-weld interface to the pre-weld interface a next weld to be performed.

The graphics 638, 640, and 652 provide a review of the completed weld to the wearer of the headwear 20. The graphic 638 (e.g., a textbox) provides results of an assessment of the completed weld. Such an assessment may comprise a determination of whether welding parameters and/or equipment settings measured and stored during the weld are within determined tolerances (e.g., set forth in the work instructions). Such an assessment may include implementing an image processing algorithm for inspecting shape, width, height, reflectivity, color, discontinuities, deformations, and/or other visual characteristics of the bead 614 and/or the workpiece. Such assessment may include checking the brightness of the images captured during the weld. For example, dark frames during the weld may indicate places along the weld where the arc was lost, and such locations may be deserving of additional inspection (either through image processing and/or by directing the operator to perform further inspection or testing). Similarly, such an assessment may include checking the equipment settings/outputs shown in graphic 640 for discontinuities which may correspond to places where the arc was lost, for example.

The graphic 640 provides a histogram of a parameter and/or setting measured during the weld. Although only a single graphic 640 is shown, any number of them corresponding to any number of parameters and/or settings may be shown. The line 650 corresponds to a target value for the parameter. The lines 646 and 648 correspond to upper and lower tolerances for the parameter. The line 644 corresponds to the measurements of the parameter for the completed weld. The marker 642 allows the operator to select any time instant during the weld. The graphic 652 displays additional information for the time instant selected by the marker 642. In an example implementation, the video frame on which the graphic elements 602, 634, 638, 640, and 652 are overlaid is the frame captured at the time instant selected by the marker 642. In this manner, by scrolling the marker 642 or triggering playback (i.e., auto-scrolling of the marker 642) a recording of the weld may be viewed on the display 304. The data presented in the post-weld interface may be associated in memory with a user profile of the operator who performed the weld. Such user profile information may be used for evaluating/certifying/etc. the operator.

In an example implementation, the graphic 640 may be analyzed to detect potential problems with the weld (e.g., a time graph of the current delivered to the weld may be analyzed for sharp spikes or discontinuities which may be indicative of extinguished arc, for example). Such a spike or discontinuities may then be called out with interface elements (e.g., an alternate marker 642, for example) on the post-weld interface. Interaction with such interface elements by the operator may then bring up a recording of the in-weld interface from the time period surrounding the detected spike or discontinuity.

Figure 6E:
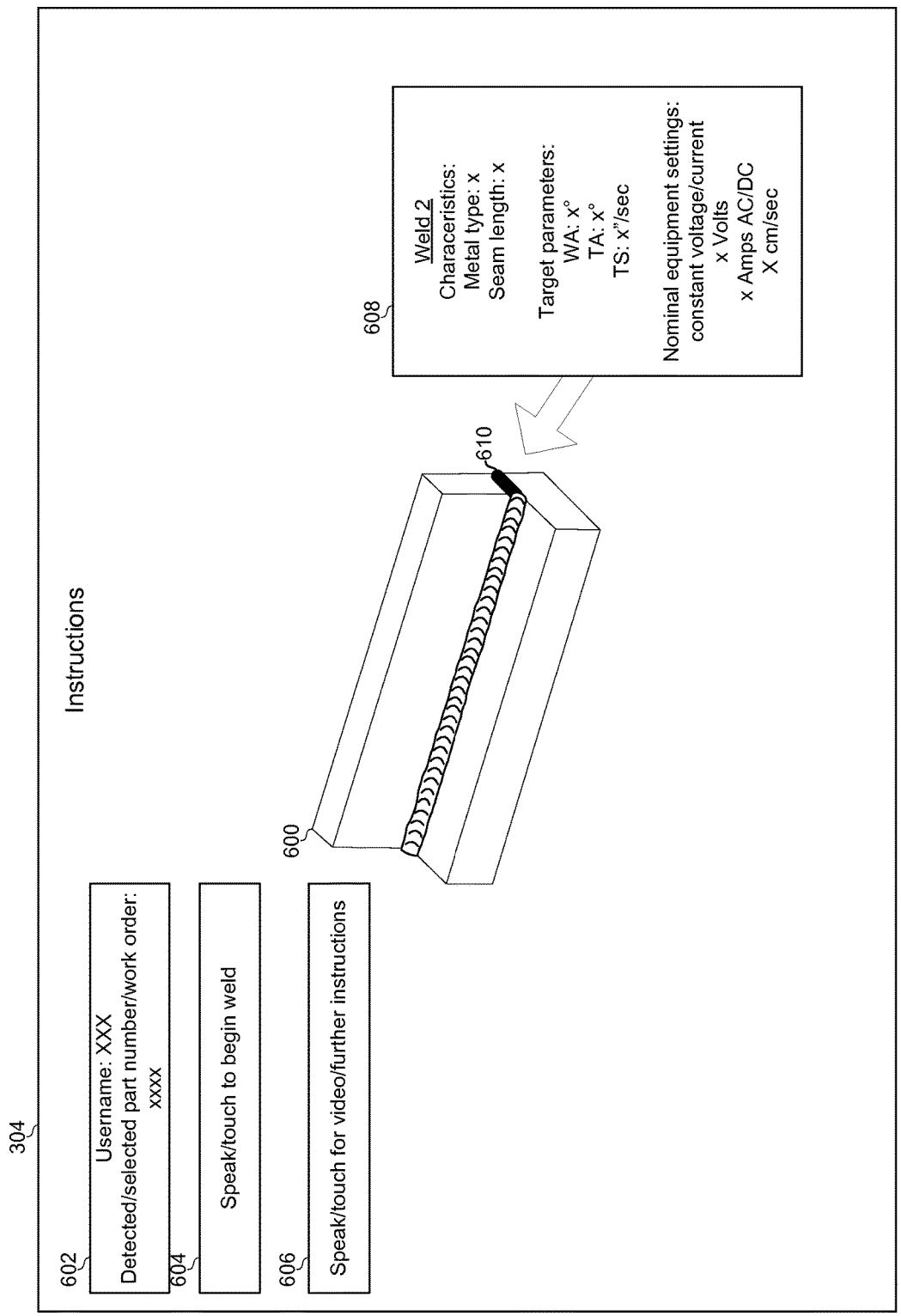

Returning to FIG. 6A, in block 666 the wearer of the headwear 20 triggers (e.g., by activating graphic 634) a transition from the post-weld interface to the pre-weld interface for the next weld to be completed. FIG. 6E shows an example of such an interface, which is similar to the interface shown in FIG. 6B, but for the next weld on the workpiece 600.

Figure 7A:
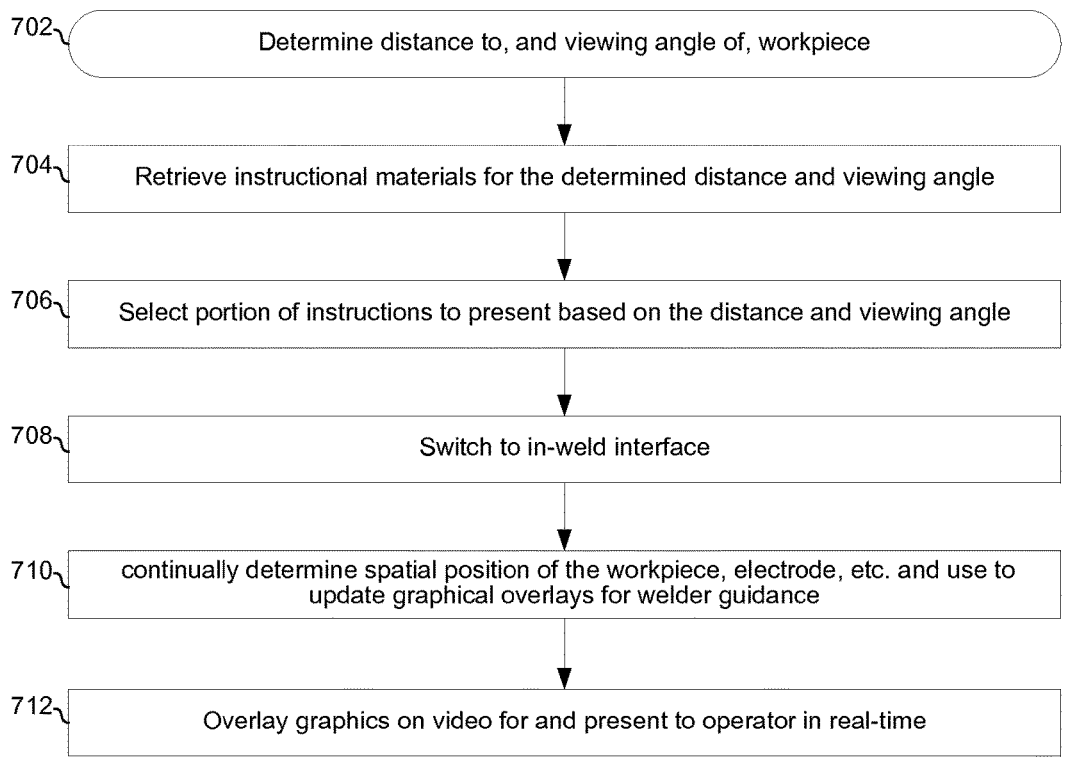
FIGS. 7A-7C illustrate an example welding process using headwear embodying aspects of this disclosure.
Figure 7B:
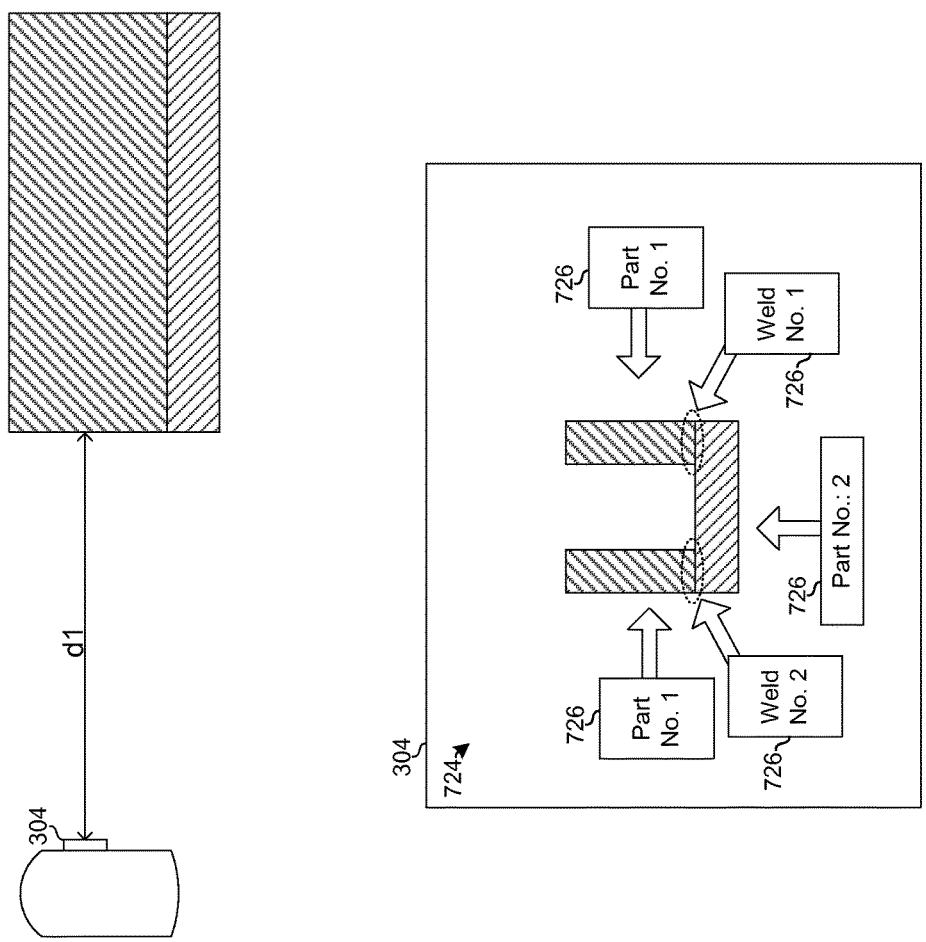
Figure 7C:
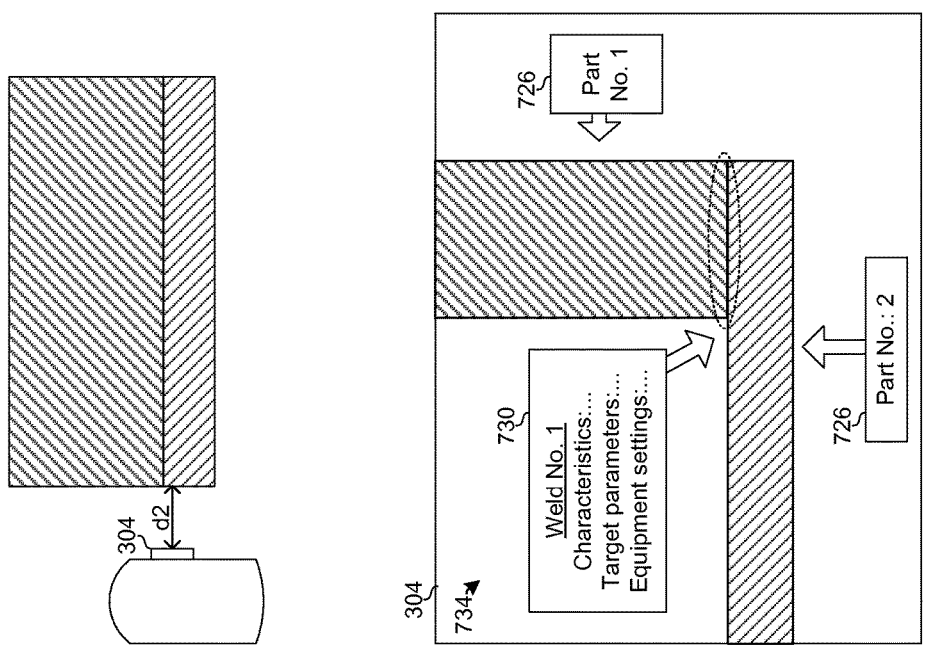

FIGS. 7A-7C illustrate an example welding process using headwear embodying aspects of this disclosure.

The process begins at block 702 in which a distance and viewing angle between the headwear 20 and a workpiece is determined. The distance may, for example, be determined based using an ultrasonic or infrared radiometer integrated into the headwear 20. Alternatively, the distance may be determined through image processing algorithms performed by GPU 418. In such an embodiment, the captured images of the workpiece may be analyzed to detect characteristics (size, position, etc.) of distinguishing features of the workpiece as they appear in the images. The characteristics may then be used in combination with stored data about the workpiece (e.g., actual dimensions of the features of the workpiece) to determine the viewing distance and angle. For example, the size of the visible markings on the workpiece, the fact that some markings on the workpiece are visible while others are not, the known actual size of the markings, and the known positioning of the markings on the workpiece may be used to determine viewing distance and angle.

In block 704, work instructions for welding the workpiece are retrieved from memory (e.g., from a networked database that the headwear 20 reaches via a LAN or the Internet).

In block 706, a portion of the work instructions are selected for presentation on the display 304 based on the determined distance to and/or viewing angle of the workpiece. When the workpiece is viewed from relatively far, the selected portion of the work instructions may comprise high-level images and work instructions that orient the operator to the overall work to assist the operator in planning a sequence of welds to be performed on the workpiece. For example, referring briefly to FIG. 7B, when the workpiece is viewed at a relatively far distance d1, instruction portion 724 is selected for presentation. Instruction portion 724 is a zoomed-out view of the workpiece comprising graphics 726 which identify part numbers for the workpiece, and two welds to be performed on the workpiece, and the sequence in which the welds are to be performed. Conversely, when the workpiece is viewed from relatively close, the selected portion of the work instructions may comprise low-level images and work instructions to guide the operator for performing a specific weld. For example, referring to FIG. 7C, when the workpiece is viewed at a close distance d2, instruction portion 734 is selected for presentation. Instruction portion 734 is a zoomed-out view comprising a portion of the graphics 726 which are still pertinent to the zoomed-in view, and graphic 730 which provides more in-depth information for welding the seam at which that the operator is looking. Although two distances and corresponding instruction portions are described, any number of instruction portions corresponding to different view distances and/or angles may be available. Similarly, switching between different instruction portions need not be based entirely, or even at all, on measured distances. Rather, the operator may select, via user interface 208, which instruction portions s/he desires to view at any given time. Furthermore, multiple instruction portions may be viewed simultaneously (e.g., in a side-by-side or picture-in-picture type view). For example, instruction portion 724 may be presented in the corner of the display while instruction portion 734 is presented on the remainder of the display.

Returning to FIG. 7A, in block 708 the wearer of the headwear 20 triggers (e.g., by activating graphic 604) a transition to an in-weld interface, such as the interface of FIG. 6C. In block 710, during welding, the headwear 20 determines the spatial position of the seam being welded, the welding torch, the electrode, and/or other objects in the field of view of camera(s) 302. The headwear 20 uses this determined spatial position information to update one or more graphical overlays in real time. The spatial position information may, for example, be determined using image processing algorithms that determine 3-D position based on pixel data of stereoscopic images captured by the camera(s) 302. The spatial position information may, for example, be used for rendering a graphic, such as 630, that overlays a real-time video of the workpiece such that the graphic is maintained in proper alignment with the workpiece (i.e., to track and compensate for the changing position of the welder's head as s/he performs the weld).

Figure 8B:
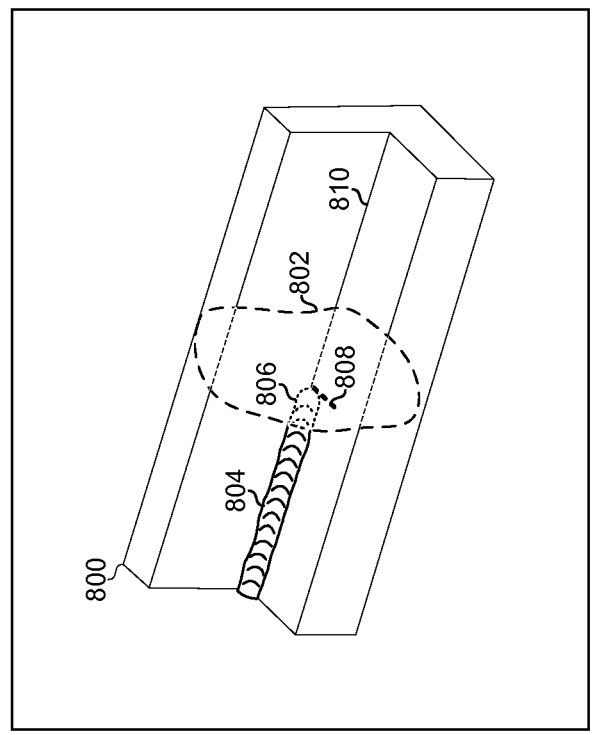
FIGS. 8A and 8B illustrate the use of a 3-D rendering generated by welding headwear for enhancing an operator's view of a workpiece to be welded.
Figure 8A:
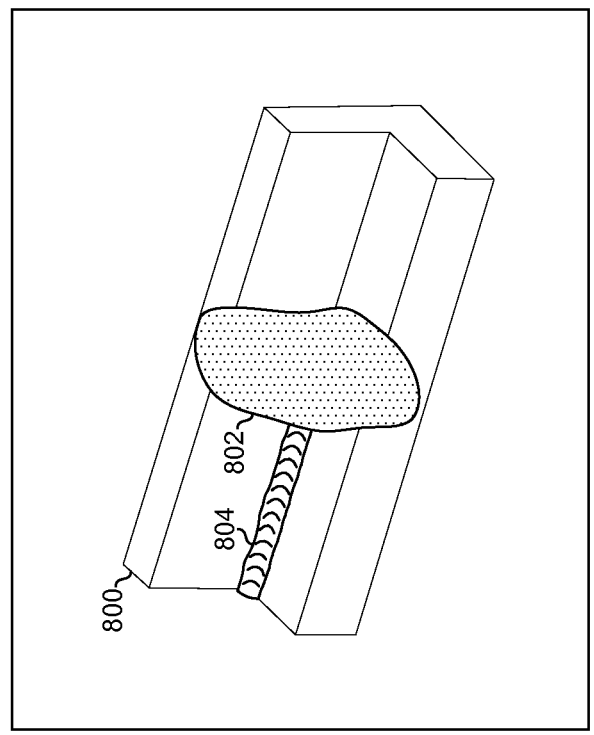

FIGS. 8A and 8B illustrate the use of a 3-D rendering generated by welding headwear for enhancing an operator's view of a workpiece to be welded. In FIG. 8A, a portion of a workpiece 800 to be welded is blocked by obstruction 802. Obstruction 802 may be, for example, the welding torch and/or hand of the operator performing the weld. In FIG. 8B, the 3-D rendering is used to digitally erase the obstruction 802 such that the wearer of the headwear 20 can "see through" the obstruction 802. For example, a virtual extension of the weld bead 804, a virtual electrode 808, and virtual extension of the seam 810 are presented in place of the obstruction 802. The rendering may be based on: current position of the workpiece (determined from most-recent images captured by the camera(s) 302), known information about the workpiece (e.g., from previously captured images when the obstruction 802 was not blocking the view of the workpiece), and chroma keying (e.g., the torch and welders gloves may be painted green or some other color).

In accordance with an example implementation of this disclosure, welding headwear (e.g., 20) comprises a camera (e.g., 302) operable to capture a picture of a field of view of a wearer of the headwear, a display operable present an image for viewing by a wearer of the headset; and circuitry (e.g., 402, 404, 406, 408, 410, 412, 416, 418, 420). The circuitry is operable to: determine an identifier (e.g., part number or work order number) associated with a workpiece (e.g., 600) in the image; retrieve, from memory, welding work instructions associated with the identifier; and generate images for presentation on the display based on one or both of the picture and the work instructions.

The determination of the identifier may comprise detection of markers on (e.g., stickers, paint, etc.) and/or features (e.g., shape, size, color, etc.) of the workpiece, and retrieval of the identifier from memory based on the detected markers and/or features. The determination of the identifier may be based on communication with the welding power source via a wired or wireless link (e.g., 25). The work instructions may comprise one or more images (e.g., 724) illustrating a sequence of welds to be performed on the workpiece, which may be included in the images generated for presentation on the display. The work instructions may indicate welding equipment settings to be used for each weld of the sequence of welds. A graphical representation of the settings may be included in the images generated for presentation on the display. The work instructions may indicate one or more welding parameter targets (e.g., corresponding to line 650) for each weld of the sequence of welds. A graphical representation of the parameter targets may be included in the images generated for presentation on the display. The work instructions may indicate a sequence of welds to be performed on the workpiece, identifiers of parts used in the sequence of welds, and inventory of the parts (e.g., the database in which the instructions are stored may be linked to an inventory database). A graphical representation of the sequence of welds and the identifiers of the parts may be included in the image generated for presentation on the display.

The circuitry may be operable to: determine a welding parameter for a welding torch (e.g., work angle, travel angle, travel speed, aim, or contact tip-to-work distance) in the picture, generate a graphical representation (e.g., 620 or 624) of the welding parameter, and include the graphical representation of the welding parameter in the image (e.g., the image shown on display 304 in FIG. 6C). The circuitry may be operable to: determine an output (e.g., volts, amps, or wire speed) of a welding power source, generate a graphical representation (e.g., 628) of the output of the welding power source, and include the graphical representation of the output of the welding power source in the generated image (e.g., the image shown on display 304 in FIG. 6C).

The circuitry may be operable to determine a distance between the welding headwear and the workpiece. The distance may be determined based on analysis of the picture and stored information about size, shape, and/or features of the workpiece. Different portions of the work instructions may be associated with different viewing distances. The circuitry may be operable to determine which of the portions of the work instructions to use for the generation of the image based on the determined distance between the welding headwear and the workpiece. Additionally or alternatively, the circuitry may be operable to provide an interface (e.g., 208) via which an operator can switch between said different portions of said work instructions (e.g., between 734 and 724) regardless of the distance from which the operator is viewing the workpiece.

The circuitry may be operable to determine whether to use one or both of the picture and the work instructions for the generation of the image based on input from a wearer or the welding headwear. The input from the wearer of the headwear may be via tactile controls (e.g., 308) of the welding headwear. The input from the wearer of the headwear may be voice input via a microphone (e.g., 308) of the welding headwear.

The circuitry may be operable to determine position and orientation of the workpiece. The generation of the image may comprise generation of a 3-D rendering of the workpiece generated based on the determined position and orientation. A first portion of the pixels of the picture may correspond to the workpiece (e.g., pixels outside of 802 in FIG. 8A), while a second portion of the pixels of the picture may correspond to an obstruction in the line of sight between the camera and the workpiece (e.g., pixels corresponding to 802). The generation of the image (e.g., the image shown on display 304 in FIG. 8B) may comprises replacement of the second portion of the pixels of the picture with corresponding pixels from the 3-D rendering.

The circuitry may be operable to monitor welding parameters and/or welding equipment settings throughout the duration of a particular weld, and store the monitored welding parameters and/or welding equipment settings to memory. The stored data may include the picture for playback at a later time. The circuitry may be operable to: generate a graphical summary (e.g., 640 and 652) of the stored welding parameters and/or equipment settings, and include the graphical summary of the tracked welding parameters and/or equipment settings in the second image (e.g., the image shown on display 304 in FIG. 6D).

The present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
    welding headwear comprising:
        a display operable to present images for viewing by a wearer of said welding headwear; and
        a processor operable to:
            determine an identifier associated with a workpiece;
            retrieve, from memory, welding work instructions associated with said identifier; and
            generate said images for presentation on said display based on said work instructions,
        wherein:
            said work instructions comprise one or more instructions, and
            said processor is operable to provide an interface via which an operator can switch between said one or more instructions.

2. The system of claim 1, wherein said processor is operable to determine said identifier by:
    detecting, through an image processing algorithm implemented by said processor, of markers on one or both of said workpiece and features of said workpiece; and
    retrieving said identifier from memory based on said one or both of said detected markers features.

3. The system of claim 1, wherein said processor is operable to:
    determine, during a manual welding operation, a welding parameter for a welding torch;
    generate a graphical representation of said welding parameter; and
    include said graphical representation of said welding parameter in said images.

4. The system of claim 1, wherein said processor is operable to:
    determine an output of a welding power source;
    generate a graphical representation of said output of said welding power source; and
    include said graphical representation of said output of said welding power source in said images.

5. The system of claim 1, wherein:
    said work instructions comprise one or more images illustrating a sequence of welds to be performed on said workpiece; and
    said one or more images illustrating said sequence of welds are included in said images generated for presentation on said display.

6. The system of claim 5, wherein:
    said welding work instructions indicate welding equipment settings to be used for each weld of said sequence of welds; and
    a graphical representation of said welding equipment settings is included in said images generated for presentation on said display.

7. The system of claim 5, wherein:
    said welding work instructions indicate one or more welding parameter targets for each weld of said sequence of welds; and
    a graphical representation of said welding parameter targets are included in said image generated for presentation on said display.

8. The system of claim 7, wherein said one or more welding parameter targets comprise one or more of: a target work angle, a target travel angle, a target travel speed, and a target contact tip-to-work distance.

9. The system of claim 5, wherein:
    said work instructions indicate a sequence of welds to be performed on said workpiece and identifiers of parts used in said sequence of welds; and
    a graphical representation of said sequence of welds and said identifiers of said parts are included in said image generated for presentation on said display.

10. The system of claim 1, wherein each of said one or more instructions is associated with a corresponding viewing distance.

11. The system of claim 1, wherein said processor is operable to determine a distance between said welding headwear and said workpiece.

12. The system of claim 11, wherein said processor is operable to determine said distance based using an image processing algorithm and stored information about one or more of: size, shape, and/or features of said workpiece.

13. The system of claim 10 wherein:
said work instructions comprise one or more instructions, wherein each of said one or more instructions is associated with a corresponding viewing distance; and
said processor is operable to determine which of said one or more instructions to use for said generation of said images for presentation on said display based on said determined distance between said welding headwear and said workpiece.

14. The system of claim 1, comprising a camera operable to capture a picture of a field of view of a wearer of said welding headwear, wherein:
said processor is operable to determine, based on input from a wearer of said welding headwear, whether to use one or both of said picture and said work instructions for said generation of said images for presentation on said display.

15. The system of claim 14, wherein said input from said wearer of said welding headwear is one or more of: input via a tactile control of said welding headwear, voice input via a microphone of said welding headwear, a gesture captured via a camera of said welding headwear, a gesture captured via an accelerometer, and a gesture captured via a gyroscope.

16. The system of claim 1, wherein said processor is operable to determine, through an image processing algorithm implemented by said processor, position and orientation of said workpiece.

17. The system of claim 16, wherein said generation of said image comprises generation of a 3-D rendering of said workpiece generated based on said determined position and orientation.

18. The system of claim 1, wherein said processor is operable to:
monitor one or both of welding parameters and welding equipment settings throughout the duration of a particular weld; and
store one or both of said monitored welding parameters and welding equipment settings to memory.

19. The system of claim 18, wherein said processor is operable to:
upon completion of said particular weld, generate a graphical summary of one or both of said stored welding parameters and equipment settings; and
include said graphical summary of said stored welding parameters and equipment settings in said images generated for presentation on said display.

20. The system of claim 1, wherein said images generated for presentation on said display comprise a graphical element that indicates output of welding equipment measured during a previously-completed welding operation.

21. The system of claim 1, comprising a camera operable to capture a video of a welding operation performed by a wearer of said welding headwear, wherein said processor is operable to:
after completion of said welding operation, analyze weld equipment output measured during said welding operation to identify a time period of interest during said welding operation; and
generate a graphical element that, when interacted with, triggers replay of a portion of said video corresponding to said identified time period.

22. The system of claim 1, wherein said processor is operable to:
retrieve, from memory, inventory of parts required for performance of said welding work; and
provide an interface via which a wearer of said headwear can order said parts.

23. A system comprising:
welding headwear comprising:
a display operable to present images for viewing by a wearer of said welding headwear; and
a processor operable to:
determine an identifier associated with a workpiece;
retrieve, from memory, welding work instructions associated with said identifier; and
generate said images for presentation on said display based on said work instructions,
wherein:
prior to beginning a welding operation, said images generated for presentation on said display correspond to a pre-weld interface;
during said welding operation, said images generated for presentation on said display correspond to an in-weld interface; and
after said welding operation, said images generated for presentation on said display correspond to a post-weld interface.

* * * * *